United States Patent
Bilger et al.

(10) Patent No.: US 9,746,760 B2
(45) Date of Patent: Aug. 29, 2017

(54) VIDEO DISPLAY WITH PHOTO-LUMINESCENT DYES

(71) Applicant: FORD GLOBAL TECHNOLOGIES, LLC, Dearborn, MI (US)

(72) Inventors: Donald Paul Bilger, Livonia, MI (US); Mahendra Somasara Dassanayake, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 14/445,637

(22) Filed: Jul. 29, 2014

(65) Prior Publication Data

US 2014/0333843 A1 Nov. 13, 2014

Related U.S. Application Data

(63) Continuation-in-part of application No. 13/036,008, filed on Feb. 28, 2011, now abandoned.

(51) Int. Cl.
| | |
|---|---|
| H04N 9/12 | (2006.01) |
| G03B 21/56 | (2006.01) |
| G03B 21/60 | (2014.01) |
| H04N 9/31 | (2006.01) |
| G03B 21/00 | (2006.01) |

(52) U.S. Cl.
CPC ........... *G03B 21/567* (2013.01); *G03B 21/60* (2013.01); *H04N 9/3129* (2013.01); *H04N 9/3155* (2013.01); *G03B 21/001* (2013.01)

(58) Field of Classification Search
None
See application file for complete search history.

(56) References Cited

U.S. PATENT DOCUMENTS

| | | | | |
|---|---|---|---|---|
| 2007/0046176 A1* | 3/2007 | Bukesov | ............... | C09K 11/08 313/496 |
| 2008/0132332 A1* | 6/2008 | Pryor | ..................... | A63F 13/00 463/31 |
| 2008/0256494 A1* | 10/2008 | Greenfield | ........... | G06F 3/0304 715/863 |
| 2008/0291140 A1* | 11/2008 | Kent | ................... | G03B 21/567 345/83 |
| 2009/0140630 A1* | 6/2009 | Kijima | ................ | C09K 11/661 313/498 |
| 2009/0289910 A1* | 11/2009 | Hattori | ................ | G02F 1/13338 345/173 |

FOREIGN PATENT DOCUMENTS

| | | | |
|---|---|---|---|
| WO | 95/24671 A1 | 9/1995 | |
| WO | WO 2010127135 A2 * | 11/2010 | ............. G09G 3/001 |

* cited by examiner

*Primary Examiner* — Dakshesh Parikh
(74) *Attorney, Agent, or Firm* — Frank A. MacKenzie; Brooks Kushman P.C.

(57) ABSTRACT

A video display system includes a light source configured to generate light and a substrate having a plurality of pixels deposited on a first side of the substrate. Each of the pixels is formed from a plurality of photo-luminescent dyes, and the light source is configured to project light onto the first side of the substrate to illuminate at least a subset of the photo-luminescent dyes in a raster pattern to generate an image. In another embodiment omitting the substrate, the photo-luminescent dyes forming the pixels are deposited directly onto a screen.

19 Claims, 2 Drawing Sheets

VIDEO DISPLAY WITH PHOTO-LUMINESCENT DYES

CROSS REFERENCE TO RELATED APPLICATIONS

This application is a Continuation-in-Part of U.S. patent application Ser. No. 13/036,008, filed on Feb. 28, 2011, which is hereby incorporated by reference in its entirety.

BACKGROUND

Video displays are becoming more common in motor vehicles. Some human machine interfaces in vehicles incorporate video displays. Video displays are also used for entertainment purposes. That is, passengers may be able to watch movies or consume other media content in the vehicle via a video display.

SUMMARY

An exemplary video display system includes a light source configured to generate light and a substrate having a plurality of pixels deposited on a first side of the substrate. Each of the pixels is formed from a plurality of photo-luminescent dyes, and the light source is configured to project light onto the first side of the substrate to illuminate at least a subset of the photo-luminescent dyes in a raster pattern to generate an image.

In another exemplary approach, the video display system includes a light source and a screen having a plurality of pixels deposited on a first side of the screen. Each of the pixels is formed from a plurality of photo-luminescent dyes, and wherein the light source is configured to project light onto the first side of the screen to illuminate at least a subset of the photo-luminescent dyes in a raster pattern to generate an image.

In a third implementation, the video display system includes a scanning laser configured to generate light and a substrate having a plurality of pixels deposited on a first side of the substrate. Each of the pixels includes a plurality of photo-luminescent dyes forming a red sub-pixel, a blue sub-pixel, a green sub-pixel, and an infrared sub-pixel. The light source is configured to project light onto the first side of the substrate to illuminate at least a subset of the photo-luminescent dyes in a raster pattern to generate an image. A screen, spaced from the substrate, is configured to display the image. A lens is disposed between the screen and the substrate and is configured to project the image onto the screen.

DETAILED DESCRIPTION

An exemplary video display system includes a light source configured to generate light and a substrate having a plurality of pixels deposited on a first side of the substrate. Each of the pixels is formed from a plurality of photo-luminescent dyes, and the light source is configured to project light onto the first side of the substrate to illuminate at least a subset of the photo-luminescent dyes in a raster pattern to generate an image. In some instances, the video display system may further include a screen for displaying the image and a lens to direct the image from the substrate to the screen. In an alternative approach, the pixels may be deposited directly onto the screen so that the substrate, and possibly a lens, may be omitted.

Figure 1:
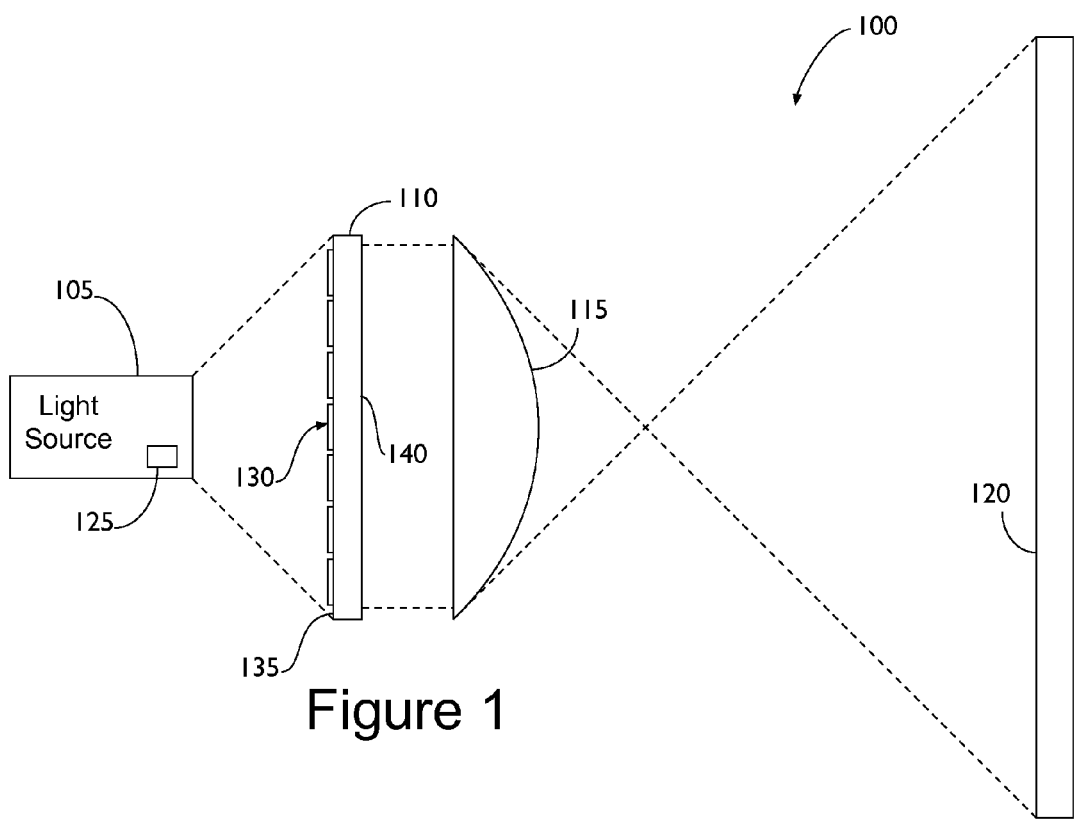
FIG. 1 illustrates an exemplary video display system.

FIG. 1 illustrates an exemplary video display system 100. The system 100 may take many different forms and include multiple and/or alternate components and facilities. While an exemplary system 100 is shown, the exemplary components illustrated are not intended to be limiting. Indeed, additional or alternative components and/or implementations may be used.

As illustrated in FIG. 1, the video display system 100 includes a light source 105, a substrate 110, a lens 115, and a screen 120.

The light source 105 may include any device configured to generate light. In one possible implementation, the light source 105 may include a scanning semiconductor laser. The operation of the light source 105 may be controlled by a processing device 125 configured to implement computer-executable instructions stored on a computer-readable medium. The processing device 125 may be configured to receive, e.g., RGB video data that represents a desired output image and cause the light source 105 to direct light to the substrate 110 or screen 120 to generate the desired image. For example, the processing device 125 may be configured to cause the light source 105 to pulse on and off in accordance with a duty cycle and in a raster pattern. The duty cycle may correspond to positions of pixels 130 deposited on either the substrate 110 or the screen 120. The processing device 125 may be configured to cause the light source 105 to direct light in an interleaved or non-interleaved fashion. The processing device 125 may be further configured to cause the light source 105 to direct light toward one or more pixels 130 or sub-pixels depending on the desired image. For example, to make a pixel appear red, the processing device 125 may cause the light source 105 to turn on when directed at a red sub-pixel and turn off when directed at other sub-pixels. To make a pixel appear white, the processing device 125 may cause the light source 105 to turn on when directed at a red sub-pixel, a blue sub-pixel, and a green sub-pixel. To make a pixel appear black, the processing device 125 may cause the light source 105 to turn off when directed at any sub-pixel. In one possible implementation, the light source 105 may generate monochromatic light that is modulated in accordance with the RGB video data received by the processing device 125. While only one light source 105 is shown in FIG. 1 for clarity, any number of light sources 105 may be included in the system 100.

The substrate 110 may be configured to receive the light generated by the light source 105. The substrate 110 may include a plurality of pixels 130 deposited on a first side 135 of the substrate 110. The pixels 130 may include sub-pixels (see FIGS. 3 and 4) formed from photo-luminescent dyes. Photo-luminescent dyes may be configured to emit light when provided with the light generated by the light source 105. The photo-luminescent dyes may emit light at a particular wavelength regardless of an operating frequency of the light source 105. The substrate 110 may include any number of pixels 130. For purposes of clarity, only seven pixels 130 are shown in FIG. 1.

The substrate 110 may be substantially transparent to visible, and in some instances infrared, light. A small, high-resolution version of the desired image may be viewed from a second side 140 of the substrate 110. For clarity, the substrate 110 shown in FIG. 1 receives light from one light source 105. If the system 100 includes multiple light sources 105, the system 100 may further include multiple substrates 110 or a single substrate 110 that receives light from more than one light source 105.

The lens 115 may be configured to project the desired image onto the screen 120. Disposed between the second side 140 of the substrate 110 and the screen 120, the lens 115 may be configured to magnify the small version of the desired image viewable from the second side 140 of the substrate 110, that is, light from the light source 105 that passes through the pixels 130 and through the second side 140 of the substrate 110 to the lens 115. The lens 115 may magnify the image to a size in accordance with the size of the screen 120.

The screen 120 may include glass or another material configured to display a full-size version of the desired image to, e.g., a user. In some instances, the screen 120 may be substantially transparent to visible, and possibly infrared, light. When used in the context of a motor vehicle, the screen 120 may be viewable to the user. The screen 120 may also be configured for touch-screen 120 capabilities through the use of, e.g., infra-red sub-pixels 305, as discussed in greater detail below.

In operation, the light source 105 projects light onto at least a subset of the photo-luminescent dyes (e.g., the sub-pixels) on the first side 135 of the substrate 110 in a raster pattern to generate the desired image.

Figure 2:
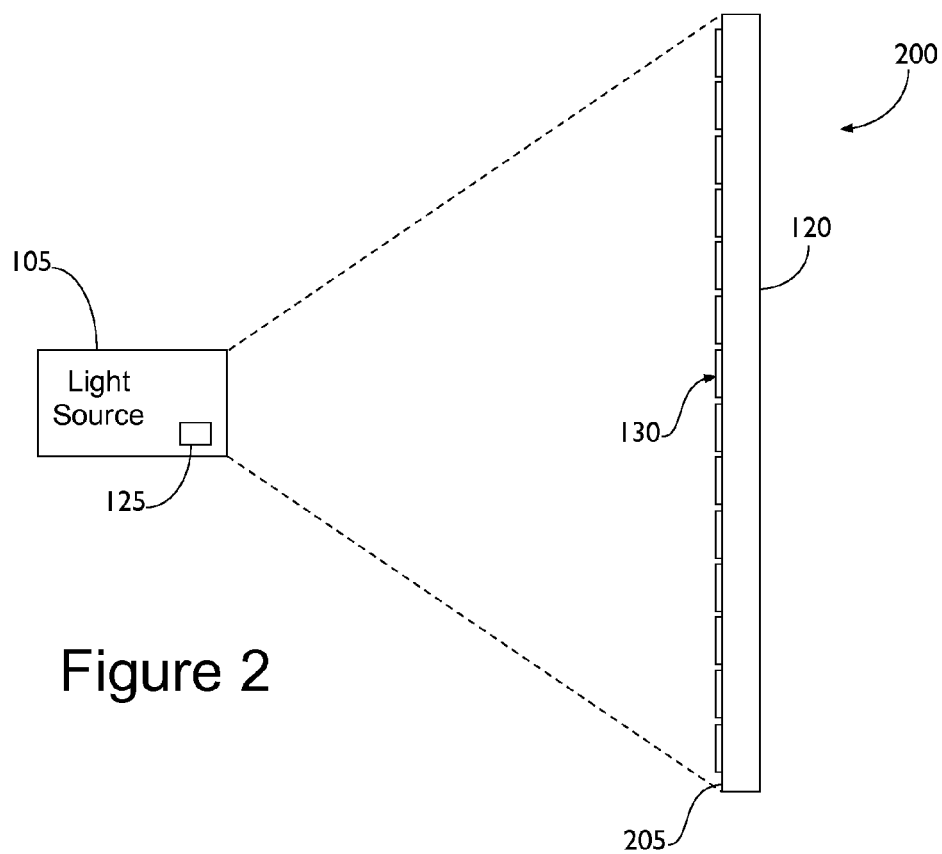
FIG. 2 illustrates another exemplary video display system.

FIG. 2 illustrates another exemplary video display system 200. As illustrated, the system 200 of FIG. 2 has the light source 105 project light directly onto pixels 130 deposited on a first surface 205 of the screen 120. As in the previous approach described above with respect to FIG. 1, each of the pixels 130 may include sub-pixels formed from photo-luminescent dyes. The light received by the screen 120 may illuminate at least a subset of the photo-luminescent dyes to generate the desired image. Further, the processing device 125 of the light source 105 may cause the light source 105 to direct light onto the screen 120 in a raster pattern.

Figure 3:
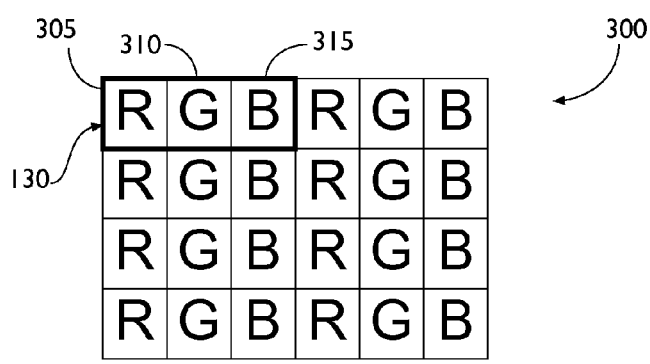
FIG. 3 illustrates an exemplary array of sub-pixels.

FIG. 3 illustrates an exemplary pixel array 300 that may be deposited onto either the substrate 110 shown in FIG. 1 or the screen 120 illustrated in FIG. 2. The pixel array 300 may include a repeating pattern of a red sub-pixel 305, a green sub-pixel 310, and a blue sub-pixel 315. In one possible implementation, at least a sub-set of similarly colored sub-pixels 305 may be vertically aligned. That is, at least some of the red sub-pixels 305 may be vertically aligned with other red sub-pixels 305, at least some of the green sub-pixels 310 may be vertically aligned with other green sub-pixels 310, and at least some of the blue sub-pixels 315 may be vertically aligned with other blue sub-pixels 315.

Figure 4:
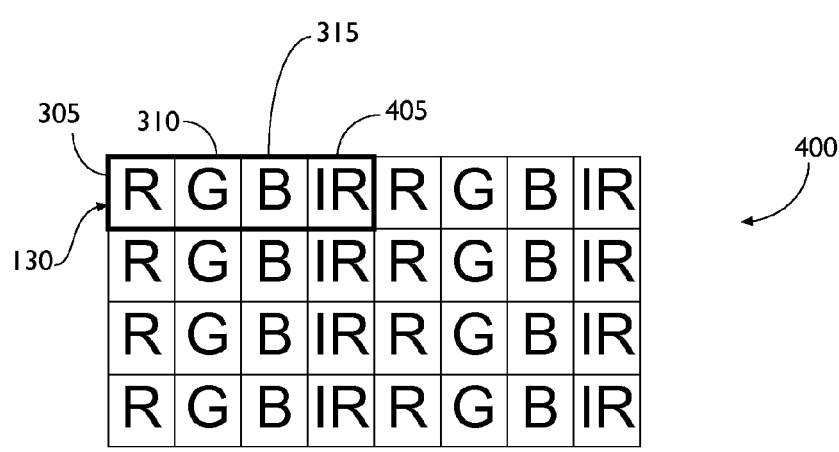
FIG. 4 illustrates another exemplary array of sub-pixels.

FIG. 4 illustrates another exemplary pixel array 400 that may be deposited onto either the substrates 110 shown in FIG. 1 or the screen 120 illustrated in FIG. 2. In addition to a repeating pattern of a red sub-pixel 305, a green sub-pixel 310, and a blue sub-pixel 315, the pixel array 400 may further include an infrared sub-pixel 305. The infrared sub-pixel 405 305 may be used to implement touch-screen 120 capabilities to the video display systems 100, 200 illustrated in FIG. 1 or 2. For example, a video camera (not shown) behind the screen 120 may be used to detect which, if any, portions of the screen 120 are being touched at any particular time. The camera may be configured to map any detected touches to a look-up table defining what action, if any, should be taken by the system 100, 200 in response to a particular touch.

In general, computing systems and/or devices, such as the video display systems 100, 200, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, look-up tables, data repositories, or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A video display system comprising:
   a light source; and
   a substrate having first and second sides;
   a plurality of pixels deposited on the substrate first side, each formed of a plurality of fluorescent dyes and including an infrared sub-pixel,
   the light source configured to project light onto the substrate first side to illuminate at least a subset of the plurality of fluorescent dyes in a raster pattern to generate an image.

2. The video display system of claim 1, wherein each pixel includes at least one of a red sub-pixel, a blue sub-pixel, and a green sub-pixel.

3. The video display system of claim 1, wherein each pixel includes a repeating pattern of a red sub-pixel, a blue sub-pixel, a green sub-pixel, and an infrared sub-pixel.

4. The video display system of claim 1, wherein the substrate is substantially transparent to visible light.

5. The video display system of claim 1, wherein the substrate is substantially transparent to infrared light.

6. The video display system of claim 1, further comprising a lens configured to project the image onto a screen and disposed between the second side of the substrate and the screen.

7. The video display system of claim 1, further comprising a screen, spaced apart from the substrate, configured to display the image.

8. The video display system of claim 1, wherein the light source includes a scanning laser configured to pulse on and off according to a duty cycle relative to each pixel position on the substrate.

9. The video display system of claim 1, wherein the fluorescent dyes are configured to emit light having a predetermined wavelength in response to receiving light from the light source.

10. The video display system of claim 9, wherein the predetermined wavelength is independent of a frequency of the light generated by the light source.

11. A vehicular video display system comprising:
    a scanning laser;
    a substrate having a plurality of pixels deposited on a first side of the substrate, each pixel includes a plurality of single stage fluorescent dyes forming a red sub-pixel, a blue sub-pixel, a green sub-pixel, and an infrared sub-pixel, and the scanning laser is configured to project light onto the first side of the substrate to illuminate at least a subset of the fluorescent dyes in a raster pattern to generate an image;
    a screen spaced from the substrate and configured to display the image; and
    a lens disposed between the screen and the substrate configured to project the image onto the screen.

12. The video display system of claim 11, wherein the fluorescent dyes are configured to emit light having a predetermined wavelength in response to receiving light from the light source, wherein the predetermined wavelength is independent of a frequency of the light generated by the light source.

13. The video display system of claim 11, wherein the screen is a touch-screen.

14. The video display system of claim 13, further comprising a video camera configured to detect at least one portion of the screen being touched.

15. The video display system of claim 11, wherein the screen comprises glass.

16. A motor vehicle video display system comprising:
    a transparent substrate having a plurality of pixels deposited thereon, each pixel being formed from a plurality of photo-luminescent dyes;
    a laser light source configured to illuminate the dyes in a raster pattern to generate an image;
    a motor vehicle touch screen configured to receive the image; and
    a lens disposed between the substrate and the motor vehicle touch screen.

17. The motor vehicle video display system of claim 16, wherein each pixel includes at least one of a red sub-pixel, a blue sub-pixel, and a green sub-pixel.

18. The motor vehicle video display system of claim 16, wherein each pixel includes an infrared sub-pixel.

19. The video display system of claim 16, wherein the substrate is substantially transparent to visible light.

* * * * *